United States Patent [19]

Sugiura et al.

[11] Patent Number: 5,248,533

[45] Date of Patent: Sep. 28, 1993

[54] BIAXIALLY ORIENTED POLYETHYLENE TEREPHTHALATE RESIN BOTTLE-SHAPED CONTAINER

[75] Inventors: Horoaki Sugiura, Koto; Fuminori Tanaka, Matsudo; Daisuke Uesugi, Koto, all of Japan

[73] Assignee: Yoshino Kogyosho Co., Ltd., Tokyo, Japan

[21] Appl. No.: 866,099

[22] Filed: Apr. 6, 1992

Related U.S. Application Data

[60] Continuation of Ser. No. 588,491, Sep. 6, 1990, abandoned, which is a continuation of Ser. No. 458,356, Dec. 29, 1989, abandoned, which is a continuation of Ser. No. 171,101, Mar. 21, 1988, abandoned, which is a division of Ser. No. 897,035, Aug. 15, 1986, abandoned, which is a continuation-in-part of Ser. No. 701,352, Feb. 13, 1985, abandoned.

[30] Foreign Application Priority Data

Feb. 15, 1984 [JP] Japan .................................. 59-26802

[51] Int. Cl.⁵ ..................... B29C 35/00; B29C 45/00; B29C 49/08; B29D 22/00
[52] U.S. Cl. .................................. 428/35.7; 215/1 C; 264/521; 264/529; 264/530; 264/535; 264/235; 264/346; 428/35.1; 428/36.92; 428/910
[58] Field of Search ............... 264/521, 523, 529, 530, 264/25, 235, 346, 519, 520, 532, 535; 215/1 C, 224, 294; 428/35.1, 35.7, 36.8, 36.92, 910

[56] References Cited

U.S. PATENT DOCUMENTS

| | | |
|---|---|---|
| 3,892,829 | 7/1975 | Uhlig ..................... 264/89 |
| 4,039,641 | 8/1977 | Collins . |
| 4,070,428 | 1/1978 | Krall et al. . |
| 4,108,937 | 8/1978 | Martineu et al. . |
| 4,233,022 | 11/1980 | Brady et al. . |
| 4,318,882 | 3/1982 | Agrawal et al. . |
| 4,379,099 | 4/1983 | Ota et al. . |
| 4,385,089 | 5/1983 | Bonnebat et al. . |
| 4,522,779 | 6/1985 | Jabarin . |
| 4,564,495 | 1/1986 | Nilsson et al. ..................... 264/291 |
| 4,584,158 | 4/1986 | Nilsson et al. ..................... 264/529 |
| 4,604,307 | 8/1986 | Spreeuwers ..................... 428/35 |
| 4,697,718 | 10/1987 | Butcher et al. ..................... 264/230 X |

FOREIGN PATENT DOCUMENTS

| | | |
|---|---|---|
| 57-53326 | 3/1982 | Japan . |
| 57-187226 | 11/1982 | Japan . |
| 58-81131 | 5/1983 | Japan . |
| 2117697 | 6/1975 | United Kingdom . |

*Primary Examiner*—Karen Aftergut
*Attorney, Agent, or Firm*—Oliff & Berridge

[57] ABSTRACT

A biaxially oriented polyethylene terephthalate resin bottle-shaped container made by thermally crystallizing a neck portion of a preform, heating the preform, blow-molding the preform to form a primary intermediate molded bottle-shaped piece, raising the temperature of the primary intermediate molded bottle-shaped piece to a temperature greater than the temperature during blow-molding the preform to thermally contract the primary intermediate molded bottle-shaped piece to form a secondary intermediate molded bottle-shaped piece, and blow-molding the secondary intermediate molded bottle-shaped piece to form a bottle-shaped container.

45 Claims, 2 Drawing Sheets

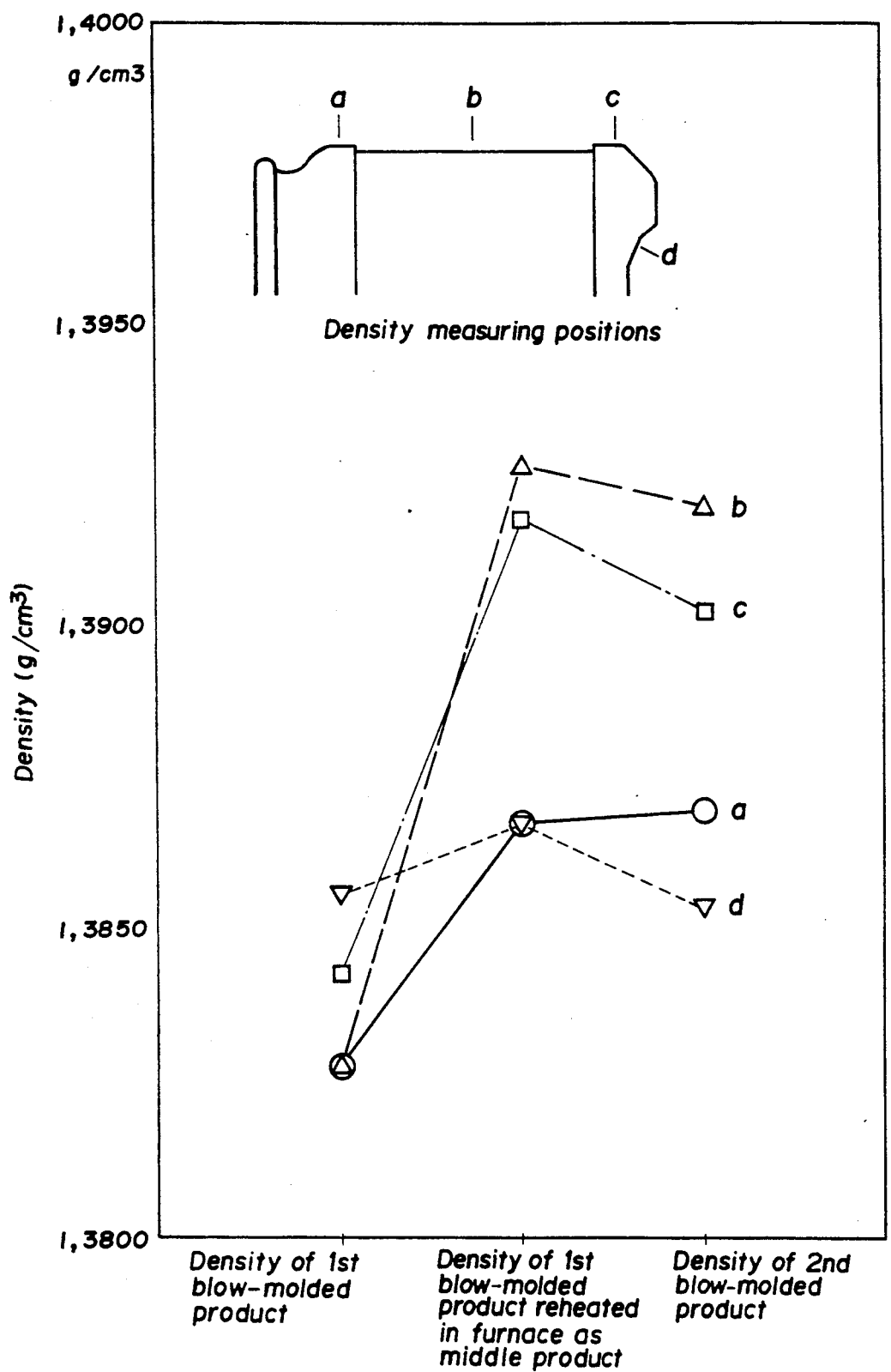

BIAXIALLY ORIENTED POLYETHYLENE TEREPHTHALATE RESIN BOTTLE-SHAPED CONTAINER

This application is a continuation of application Ser. No. 07/588,491 filed Sep. 6, 1990, now abandoned, which is a continuation of application Ser. No. 07/458,356 filed Dec. 29, 1989, now abandoned, which in turn is a continuation of application Ser. No. 07/171,101 filed Mar. 21, 1988, now abandoned, which is a division of application Ser. No. 06/897,035 filed Aug. 15, 1986, now abandoned, which in turn is a continuation-in-part of application Ser. No. 06/701,352 filed Feb. 13, 1985, now abandoned.

BACKGROUND OF THE INVENTION

The present invention relates to a method of blow-molding a biaxially-oriented polyethylene terephthalate resin bottle-shaped container, and the biaxially-oriented polyethylene terephthalate resin bottle-shaped container made according to said process.

Polyethylene terephthalate resin (hereinafter referred to as "PET") has stable physical properties, excellent transparency and high mechanical strength. Also, PET causes no pollution when incinerated. PET is widely used in the production of biaxially-oriented blow-molded bottle-shaped containers, and is particularly useful for bottling foodstuffs.

PET bottle-shaped containers have a number of excellent properties as described above, however, blow-molded bottle-shaped containers of biaxially-oriented PET which are not heat treated suffer remarkable deformation at temperatures of 70° C. or more. Therefore, such PET bottle-shaped containers cannot be used to bottle retort food, which is heat treated by allowing the food to stand for 30 min. at 120° C., or other heat treated food. Accordingly, there is great demand for PET bottle-shaped containers which have high heat resistance.

There are several conventional methods of imparting heat resistance to PET bottle-shaped containers such as (1) heating a blowing mold during blow-molding of a PET bottle-shaped container to a temperature higher than the target heat resistance temperature value to increase the density of the PET bottle-shaped container; (2) heat setting a PET bottle-shaped container after blow-molding to remove residual strain produced by blow-molding; and (3) blow-molding an intermediate molded piece by first molding a primary blow-molded container, then reheating it at approximately 110° C., and finally blowing it again to produce a bottle-shaped container.

In method (1), the moldability of the PET decreases as the mold temperature rises. According to this method, the PET is heat resistant up to a maximum of approximately 100° C. This PET cannot be used for bottle-shaped containers containing food which is heat treated at temperatures much higher than 100° C. Methods (2) and (3) of imparting heat resistance to a PET bottle-shaped container cannot expect to produce a heat resistance higher than that of method (1).

SUMMARY OF THE INVENTION

Accordingly, it is an object of the present invention to provide a biaxially-oriented PET bottle-shaped container, and a method of blow-molding the same which can eliminate the aforementioned drawbacks and disadvantages of the conventional methods.

It is another object of the present invention to provide a biaxially-oriented PET bottle-shaped container having very high heat resistance and a method of blow-molding the same. This object is accomplished by a method in which a preform is biaxial-orientation blow-molded to form a primary intermediate molded piece, the primary intermediate molded piece is heat treated to thermally contract and deform the piece to form a secondary intermediate molded piece and then the secondary intermediate molded piece is blow-molded to form a final bottle-shaped container.

The foregoing objects and other objects, as well as the characteristic features of the invention will become more fully apparent and more readily understandable from the following description and the appended claims when read in conjunction with the accompanying drawings.

BRIEF DESCRIPTION OF THE DRAWINGS

FIG. 3 is a graphic diagram showing the relationship between the density and the blow-molding temperature of the blow-molded bottle-shaped container of the present invention.

DESCRIPTION OF THE PREFERRED EMBODIMENTS

An embodiment of the present invention will now be described in detail with reference to the accompanying drawings.

Figure 1:
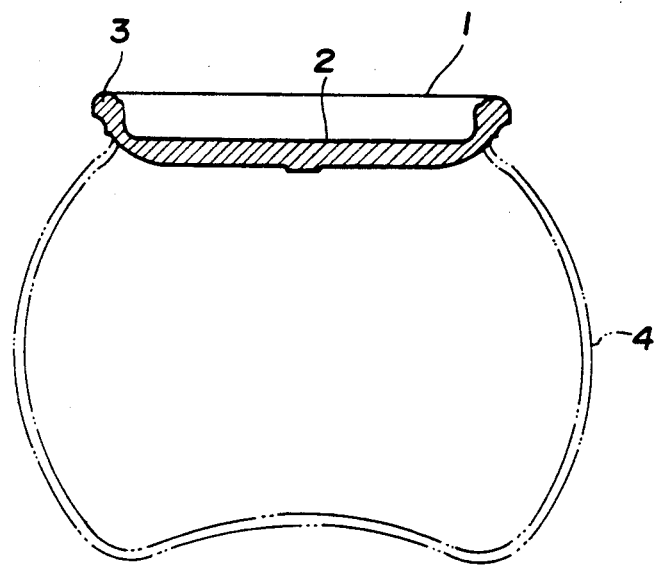
FIG. 1 is a longitudinal sectional view depicting the primary blow-molding state of a primary intermediate molded piece according to the present invention.

With reference to FIG. 1, a method of blow-molding a biaxially-oriented PET bottle-shaped container according to the present invention comprises the steps of: heating the body portion 2 of a preform 1, which is formed in a desired shape in advance, at 90° to 130° C. (preferably 100° to 120° C.) until the temperature approaches but does not reach the thermal crystallization temperature of the PET, biaxial-orientation blow-molding the preform in a primary blowing mold heated at 110° to 230° C. to form a primary intermediate molded bottle-shaped piece 4, heating the primary intermediate molded bottle-shaped piece at 130° to 255° C. (preferably 170° to 255° C. or more preferably 200° to 235° C.) which is in a range that does not exceed the temperature immediately before the melting point at 255° C. of polyethylene terephthalate, or at a temperature which is at least 20° C. greater than the primary blowing mold temperature to form a secondary intermediate molded bottle-shaped piece 5 (FIG. 2), and blow-molding the secondary intermediate molded bottle-shaped piece 5 in a secondary blowing mold heated at 100° to 150° C. (preferably 120° to 150° C.), which is higher than the sterilizing temperature of the content filled in the molded bottle-shaped container, to form a final bottle-shaped container 6.

More particularly, the method of blow-molding a biaxially-oriented PET bottle-shaped container according to the present invention includes a first step of injection molding, in advance, a preform 1 in a desired shape, a second step of thermally crystallizing, without orienting deformation, a neck portion of the bottle-shaped container 6 which remains in the same shape as at the injection molding time, and a third step of blow-molding the body of the bottle-shaped container 6.

The preform 1 is injection molded by ordinary injection molding techniques. In the exemplified embodiment, the injection molded preform 1 is formed in a dish shape as shown by solid lines in FIG. 1. The preform 1 has a neck portion 3 and a body portion 2. The body portion 2 becomes the body, including a bottom, of the biaxially-oriented blow-molded bottle-shaped container 6.

The body 2 is orientation magnified 5 to 13 times so that the orienting density may become 1.36 or more and so that the body 2 is not thermally crystallized even with a primary blowing mold temperature of 110° to 230° C. at the blow-molding time.

Thus, the body 2 is formed in the primary intermediate molded piece 4 without thermal crystallization even at the primary blowing mold temperature of 110° to 230° C. which is higher than the crystallizing temperature of the PET.

The peripheral end of a connecting portion between the body portion 2 and the neck portion 3 and the central portion of the body portion are hardly oriented as compared with other parts of the body portion 2 and are also readily crystallized. These portions are therefore preferably reduced in thickness relative to the other parts of the body portion 2 so as to be readily oriented.

The neck portion 3 of the preform 1 is, preferably, thermally crystallized or whitened prior to biaxial-orientation blow-molding the preform to form the primary intermediate molded bottle-shaped piece 4. The whitening of the neck portion 3 may be performed by sufficiently heating the neck portion 3 to crystallize the PET, followed by gradual cooling. It should be noted, however, that all deformation of the neck portion 3 should be avoided when whitening the neck portion 3. Particularly, deterioration of the degree of the circularity of the neck portion 3 should be avoided since such deformation would largely reduce the function of the final blow-molded bottle-shaped container 6.

After the neck portion 3 of the preform 1 is whitened in this manner, the preform 1 is blow-molded to form the bottle-shaped container 6. The blow-molding step involves biaxial-orientation blow-molding the preform 1 to form a primary intermediate molded bottle-shaped piece 4, heating the primary intermediate molded bottle-shaped piece 4 to thermally shrink it and form a secondary intermediate molded bottle-shaped piece 5, and blow molding the secondary intermediate molded bottle-shaped piece 5 to form a final bottle-shaped container 6.

The step of biaxial-orientation blow-molding the preform 1 to form the primary intermediate molded bottle-shaped piece 4 is performed by first heating the body portion 2 of the preform 1 at 90° to 130° C. (preferably 100° to 120° C.) until the temperature approaches but does not reach the thermal crystallization temperature of the PET.

Next, the preform 1 is blow-molded in a blowing mold heated at 110° to 230° C. to form the primary intermediate bottle-shaped piece 4. The primary intermediate molded bottle-shaped piece 4 is oriented so that the area magnification of the preform 1 to the primary intermediate molded bottle-shaped piece 4 is in a range of 5 to 13 times and so that the density of the resin becomes 1.36 or more to prevent the bottle-shaped piece 4 from being thermally crystallized by the heating temperature of the primary mold and the heating temperature of the secondary intermediate molded piece.

The primary intermediate molded bottle-shaped piece 4 is then heated to thermally shrink it to form the secondary intermediate molded bottle-shaped piece 5. This shrinking step is performed to eliminate residual stress developed in the blow-molded piece 4 from biaxial-orientation blow-molding. The orientation blow-molded portion of the primary intermediate molded bottle-shaped piece 4 is deformed by the internal residual stress by heating the primary intermediate molded bottle-shaped piece 4 in a furnace at 130° to 255° C. or a temperature which is at least 20° C. greater than the primary blowing mold temperature, (preferably 170° to 255° C. or more preferably 200 to 235° C.), to eliminate the residual stress. The deformation produced by the elimination of the internal residual stress acts to contract or shrink the orientation-molded portion of the primary intermediate molded bottle-shaped piece 4. Consequently, the orientation-molded portion of the secondary intermediate molded bottle-shaped piece 5 is molded by this contraction deformation.

Figure 2:
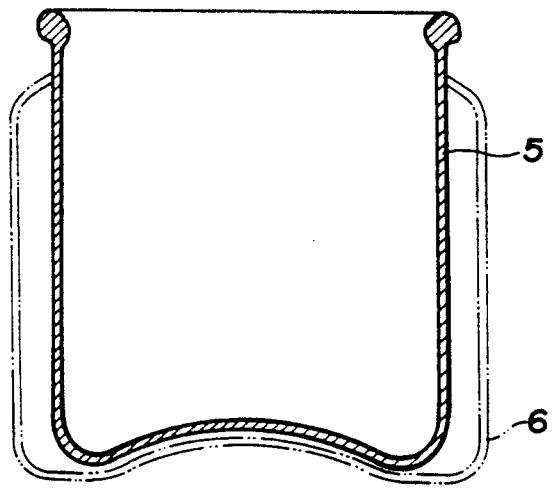
FIG. 2 is a longitudinal sectional view showing the secondary blow-molding state of a secondary intermediate molded piece according to the present invention.

The body portion of the secondary intermediate molded bottle-shaped piece 5 formed by the shrinkage deformation is predetermined in the orienting magnification from the preform 1 to the primary intermediate molded piece 4, and the size of the primary intermediate molded piece 4, to be substantially equal to or slightly smaller than the orientation-molded body portion of the final bottle-shaped container 6 as shown in FIG. 2.

Finally, the secondary intermediate molded bottle-shaped piece 5 is blow-molded to form the final bottle-shaped container 6. The secondary intermediate molded bottle-shaped piece 5 is thermally shrunk by heating at 130° to 255° C. or at a temperature which is at least 20° C. greater than the primary blowing mold temperature (preferably 170° C. or more preferably 200° to 235° C.) as described above, and is placed in the secondary blowing mold which is heated at a temperature of 100° to 150° C. (preferably 120° to 150° C.). The temperature of the secondary blowing mold is several degrees greater than the maximum temperature the molded bottle-shaped container 6 will be subjected to during use.

The body shape of the blow-molded portion of the secondary intermediate molded bottle-shaped piece 5 is substantially equal to or slightly smaller than the corresponding body shape of the bottle-shaped container 6 as described above. Accordingly, the orientation magnification from the secondary intermediate molded bottle-shaped piece 5 to the final bottle-shaped container 6 is quite small, and consequently almost no stress is created when the bottle-shaped container 6 molded from the secondary intermediate molded bottle-shaped piece 5 is orientation-molded.

Further, since the bottle-shaped container 6 is blow-molded by a secondary blowing mold heated at a temperature greater than the temperature the bottle-shaped container will be subjected to during use, the bottle-shaped container 6 is heatset by the secondary blowing mold, and therefore the bottle-shaped container 6 has not residual stress as well as high heat resistance.

Preferably, the primary intermediate molded bottle-shaped piece is formed in a primary blowing mold and the secondary intermediate molded bottle-shaped piece is blown into the bottle-shaped container in a secondary blowing mold having a mold size equal to or slightly larger than the secondary intermediate molded bottle-shaped piece, and smaller than the primary blowing mold.

FIG. 3 shows the relationship between the density of the molding material at the respective molding steps and the mold temperatures.

A specific example of the method of blow-molding a biaxially-oriented PET bottle-shaped container according to the present invention will now be described.

A preform 1 was biaxial-orientation blow-molded to form a primary intermediate molded bottle-shaped piece 4. The preform was heated to a temperature of 115° C. and was blow-molded at a primary blowing mold temperature of 180° C. under a blowing pressure of 25 kg/cm$^2$ for a blowing time of 1.4 sec. The primary intermediate molded bottle-shaped piece 4 was then heated and thermally shrunk to form a secondary intermediate molded bottle-shaped piece 5 at a heating temperature of 225° C. The secondary intermediate molded bottle-shaped piece 5 was blow-molded at a secondary blowing mold temperature of 140° C. under a blowing pressure of 30 kg/cm$^2$ for a blowing time of 4.4 sec. to form the final blow-molded bottle-shaped container 6.

The heat resistance of the blow-molded bottle-shaped container 6 was then tested by immersing it without a cap for 30 minutes in a tank of glycerin heated at 120° C. The bottle-shaped container 6 was then removed from the glycerin and water-cooled. The volumetric variation of the container before heating and after heating was measured. The volumetric rate of change of the bottle-shaped container 6 was found to be 0.35%. From this result, it is apparent that a PET bottle-shaped container having sufficiently high heat resistance can be provided by the present invention.

According to the present invention as described above, the method of blow-molding a PET bottle-shaped container provides the blow-molded bottle-shaped container of the present invention which has no residual stress and extremely high heat resistance. The heat resistance temperature value is remarkably increased when compared with that of a conventional container.

While the present invention has been described in detail and with reference to specific examples thereof, it will be apparent to one skilled in the art that various changes and modifications can be made without departing from the spirit and scope thereof.

What is claimed is:

1. A biaxially-oriented polyethylene terephthalate resin bottle-shaped container, said container exhibiting no substantial deformation when exposed to a temperature of 120° C. for 30 minutes and being made according to a method comprising the sequential steps of:
   (a) thermally crystallizing a neck portion of a preform;
   (b) heating said preform;
   (c) biaxial-orientation blow-molding said preform at a predetermined temperature to form a primary intermediate molded bottle-shaped piece; then
   (d) applying heat to said primary intermediate molded bottle-shaped piece for heat treating said primary intermediate molded bottle-shaped piece by heating said primary intermediate molded bottle-shaped piece to a temperature greater than said predetermined temperature during biaxial-orientation blow molding of said preform to thermally contract said primary intermediate molded bottle-shaped piece to form a secondary intermediate molded bottle-shaped piece; and
   (e) biaxial-orientation blow-molding said secondary intermediate molded bottle-shaped piece to form said bottle-shaped container exhibiting no substantial deformation when exposed to said temperature of 120° C. due to said application of heat to said primary intermediate molded bottle-shaped piece at said greater temperature.

2. The container of claim 1 wherein said preform is heated to a temperature which approaches but does not reach a thermal crystallization temperature of polyethylene terephthalate.

3. The container of claim 1 wherein said primary intermediate molded bottle-shaped piece is heat treated in a range that does not exceed a temperature immediately before a melting temperature point of 255° C. of polyethylene terephthalate.

4. The container of claim 1, wherein said step of thermally crystallizing is conducted without orienting deformation.

5. The container according to claim 4, wherein said neck portion remains in substantially the same shape during said step of thermally crystallizing.

6. The container according to claim 1, wherein said biaxial-orientation blow-molding of said preform is performed in a first blow-mold at a first blow-mold temperature, and wherein during said heat treating, said primary intermediate molded bottle-shaped piece is heated to a temperature at least 20° C. higher than said first blow-mold temperature.

7. The container according to claim 1, wherein said preform is blow-molded in a first blow-mold, and said secondary intermediate molded bottle-shaped piece is blow-molded in a second blow-mold, separate from said first blow-mold.

8. The container according to claim 1 wherein said primary intermediate method bottle-shaped piece is heat treated at 170° C. to 255° C.

9. The container of claim 1 wherein a size of said primary intermediate molded bottle-shaped piece is at least as great as a size of said bottle-shaped container.

10. The container of claim 1 wherein a maximum diameter of said primary intermediate molded bottle-shaped piece is at least as great as a maximum diameter of said bottle-shaped container.

11. The container of claim 1 wherein an orientation-molded portion of said secondary intermediate molded bottle-shaped piece is substantially the same size as or slightly smaller than an orientation-molded portion of said bottle-shaped container.

12. The container of claim 1 wherein orientation magnification from said secondary intermediate molded bottle-shaped piece to said bottle-shaped container is quite small, so that almost no residual stress is created in said bottle-shaped container.

13. The container of claim 1 wherein said preform is heated at 100° C. to 120° C.

14. The container according to claim 1, wherein said preform is orientation area magnified 5 to 13 times to form said primary intermediate molded bottle-shaped piece.

15. The container according to claim 1, wherein said preform is orientation area magnified 5 to 13 times to form said primary intermediate molded bottle-shaped piece so that a body portion of said container is not thermally crystallized even when subjected to said first blow-mold heated at 110° to 230° C.

16. The container according to claim 1, wherein a body portion of said container is clear and transparent.

17. The container according to claim 1, wherein a temperature of a secondary blow-mold is several degrees greater than a preselected maximum temperature to which said molded bottle-shaped container is subjected during use.

18. The container according to claim 1, wherein a temperature of a secondary blow-mold is several degrees greater than a preselected maximum temperature to which said molded bottle-shaped container is subjected during use such that said bottle-shaped container is heat set by said secondary blow-mold, and therefore said bottle-shaped container has no residual stress as well as high heat resistance.

19. A biaxially-oriented polyethylene terephthalate resin bottle-shaped container, said container exhibiting no substantial deformation when exposed to a temperature of 120° C. for 30 minutes, and being made according to a method comprising the sequential steps of:
  (a) thermally crystallizing a neck portion of a preform;
  (b) heating said preform;
  (c) biaxial-orientation blow-molding said preform in a first blow-mold heated at 110° C. to 230° C. to form a primary intermediate molded bottle-shaped piece; then
  (d) applying heat to said primary intermediate molded bottle-shaped piece for heat treating said primary intermediate molded bottle-shaped piece by heating said primary intermediate molded bottle-shaped piece to a temperature at least 20° C. higher than said temperature of said first heated blow-mold to thermally contract said primary intermediate molded bottle-shaped piece to form a secondary intermediate molded bottle-shaped piece; and
  (e) biaxial-orientation blow-molding said secondary intermediate molded bottle-shaped piece in a secondary blow-mold, distinct from said first blow-mold, heated at 100° C. to 150° C. to form said bottle-shaped container exhibiting no substantial deformation when exposed to said temperature of 120° C. due to said application of heat to said primary intermediate molded bottle-shaped piece at said higher temperature.

20. The biaxially-oriented polyethylene terephthalate resin bottle-shaped container of claim 17, said container exhibiting no substantial deformation when contents of said container are heat treated in said container.

21. The container according to claim 19 wherein said primary intermediate molded bottle-shaped piece is heat treated at 130° to 255° C.

22. The container according to claim 19 wherein said primary intermediate molded bottle-shaped piece is heat treated at 200° to 235° C.

23. The container according to claim 19 wherein said primary intermediate molded bottle-shaped piece is heat treated at 170° to 255° C.

24. The container according to claim 19 wherein said second blow-mold is heated at 120° C. to 150° C.

25. The container of claim 19 wherein at least one of a height and a maximum diameter of said primary intermediate molded bottle-shaped piece is at least as great as a corresponding one of a height and a maximum diameter of said bottle-shaped container.

26. The container of claim 19 wherein a size of said primary intermediate molded bottle-shaped piece is at least as great as a size of said bottle-shaped container.

27. The container of claim 19 wherein a maximum diameter of said primary intermediate molded bottle-shaped piece is at least as great as a maximum diameter of said bottle-shaped container.

28. The container of claim 19 wherein an orientation-molded portion of said secondary intermediate molded bottle-shaped piece is substantially the same size as or slightly smaller than an orientation-molded portion of said bottle-shaped container.

29. The container of claim 19 wherein an orientation magnification from said secondary intermediate molded bottle-shaped piece to said bottle-shaped container is quite small, so that almost no residual stress is created in said bottle-shaped container.

30. The container of claim 19 wherein said preform has a predetermined shape prior to said step of heating said preform.

31. The container of claim 30 wherein said preform has said predetermined shape formed by injection molding.

32. The container of claim 19 wherein said preform is heated to 100° C. to 120° C.

33. The container of claim 19 wherein said second blow-mold is heated to a temperature higher than a sterilizing temperature of contents for said bottle-shaped container.

34. The container of claim 19, wherein said step of thermally crystallizing is conducted without orienting deformation.

35. The container according to claim 34, wherein said neck portion remains in substantially the same shape during said step of thermally crystallizing.

36. The container of claim 19 wherein said heat treating of said primary intermediate molded bottle-shaped piece to form said secondary intermediate molded bottle-shaped piece eliminates residual stress developed in said primary intermediate molded bottle-shaped piece from biaxial orientation blow-molding.

37. The container of claim 19 wherein said heat treating of said primary intermediate molded bottle-shaped piece deforms said primary intermediate molded bottle-shaped piece by eliminating internal residual stress to form said secondary intermediate molded bottle-shaped piece.

38. The container according to claim 19, wherein said preform is orientation area magnified 5 to 13 times to form said primary intermediate molded bottle-shaped piece.

39. The container according to claim 19, wherein said preform is orientation area magnified 5 to 13 times to form said primary intermediate molded bottle-shaped piece so that a body portion of said container is not thermally crystallized even when subjected to said first blow-mold heated at 110° to 230° C.

40. The container according to claim 19, wherein said preform is orientation area magnified so that a density of said resin becomes 1.36 or greater.

41. The container according to claim 19, wherein a body portion of said container is clear and transparent.

42. The container according to claim 19, wherein said temperature of secondary blow-mold is several degrees greater than a preselected maximum temperature to which said molded bottle-shaped container is subjected during use.

43. The container according to claim 19, wherein said temperature of secondary blow-mold is several degrees greater than a preselected maximum temperature to which said molded bottle-shaped container is subjected during use such that said bottle-shaped container is heat set by said secondary blow-mold, and therefor said bottle-shaped container has no residual stress as well as high heat resistance.

44. The container of claim 19, wherein said preform is heated to 90° C. to 130° C.

45. A biaxially-oriented polyethylene terephthalate resin bottle-shaped container, said container exhibiting no substantial deformation when exposed to a temperature of at least 120° C. for 30 minutes, and being made according to a method comprising the sequential steps of:

(a) thermally crystallizing a neck portion of a preform;

(b) heating said preform;

(c) biaxial-orientation blow-molding said preform in a first blow-mold heated at 110° to 230° C. to form a primary intermediate molded bottle-shaped piece, said preform being orientation area magnified 5 to 13 times to form said primary intermediate molded bottle-shaped piece; then (d) applying heat to said primary intermediate molded bottle-shaped piece for heat treating said primary intermediate molded bottle-shaped piece by heating said primary intermediate molded bottle-shaped piece to a temperature at least 20° C. higher than said temperature of said first heated blow-mold to thermally contract said primary intermediate molded bottle-shaped piece to form a secondary intermediate molded bottle-shaped piece; and (e) biaxial-orientation blow-molding said secondary intermediate molded bottle-shaped piece in a secondary blow-mold, distinct from said first blow-mold, heated at 100° C. to 150° C. to form said bottle-shaped container, said secondary intermediate molded bottle-shaped piece having a substantially small orientation magnification so that almost no residual stress is created in said bottle-shaped container.

* * * * *

UNITED STATES PATENT AND TRADEMARK OFFICE
CERTIFICATE OF CORRECTION

PATENT NO. : 5,248,533

DATED : September 28, 1993

INVENTOR(S) : Hiroaki SUGIURA et al.

It is certified that error appears in the above-identified patent and that said Letters Patent is hereby corrected as shown below:

On the title page, item [75] Change "Horoaki" to --Hiroaki--.

Signed and Sealed this

Twenty-sixth Day of April, 1994

Attest:

BRUCE LEHMAN

Attesting Officer     Commissioner of Patents and Trademarks